Patented Mar. 13, 1945

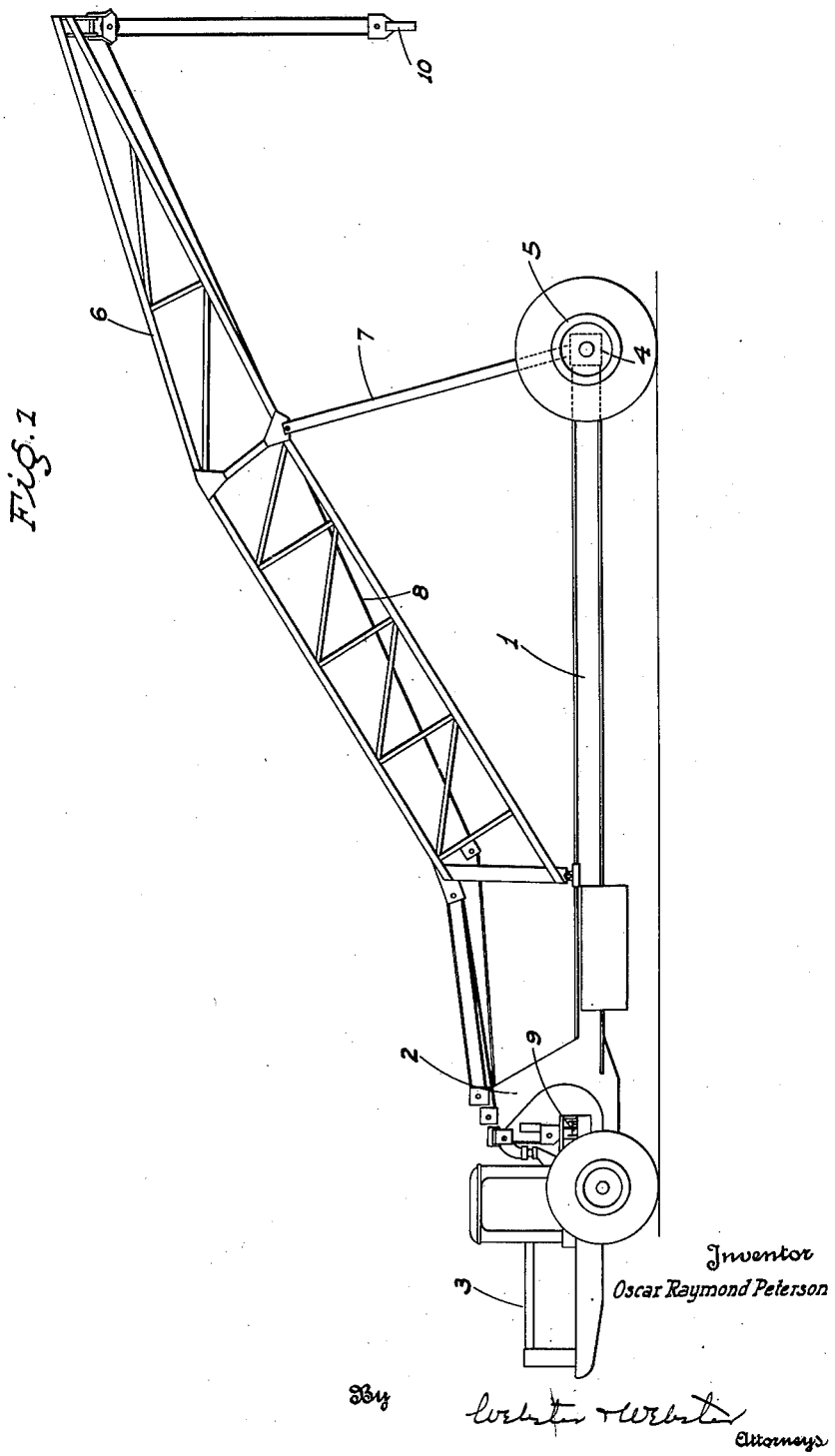

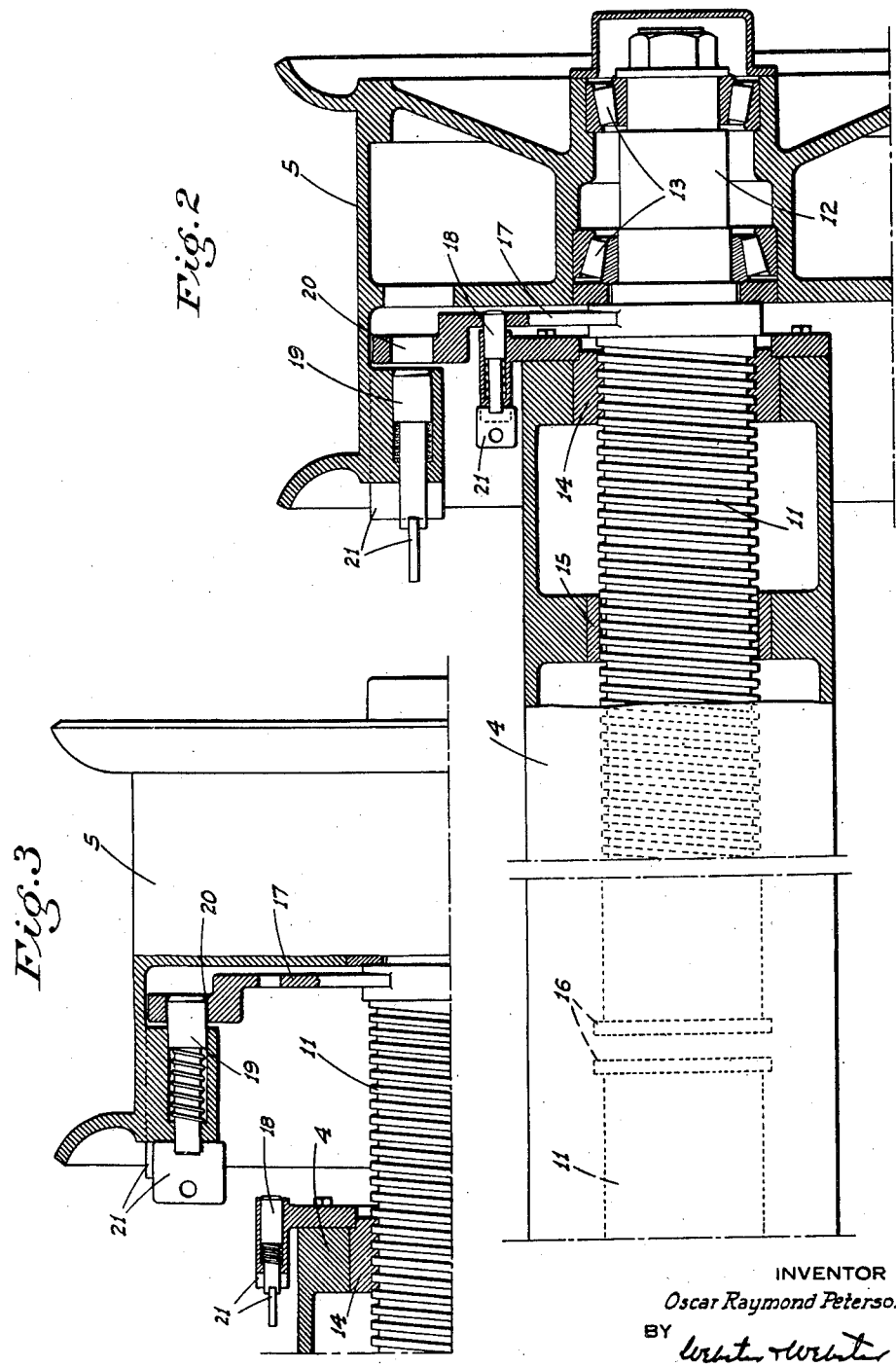

2,371,261

UNITED STATES PATENT OFFICE 2,371,261

WHEEL GAUGE ADJUSTMENT

Oscar Raymond Peterson, Oakland, Calif., assignor to R. G. Le Tourneau, Inc., Stockton, Calif., a corporation of California Original application September 18, 1943, Serial No. 502,913. Divided and this application May 1, 1944, Serial No. 533,550

3 Claims. (Cl. 212—8)

This invention is directed to, and it is an object to provide, a novel wheel gauge adjustment for wheel-supported implements and particularly portable cranes; the present invention being a division of copending application, Serial No. 502,913, filed September 18, 1943.

Another object of this invention is to provide, in combination in a portable crane, a longitudinally extending boom supporting body, transversely spaced wheels supporting said body adjacent one end thereof, and means mounting the wheels on the body for varying or adjusting the gauge of said wheels, whereby increase of the gauge of said wheels, when the crane is in use, provides greater lateral stability.

A further object of the invention is to provide an implement wheel gauge adjustment which is actuated, to either increase or decrease the gauge, by rotation of the wheels of the implement; the adjusting mechanism normally being inoperative and the wheels running free relative thereto.

A further object of the invention is to produce a simple, inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation, somewhat diagrammatic, of a wheel supported crane embodying the invention.

Figure 2 is an enlarged fragmentary sectional elevation of one of the extensible axles; the axle and its wheel being shown in retracted position.

Figure 3 is a similar view, but shows the axle and its wheel run out to an extended position.

Referring now more particularly to the characters of reference on the drawings, the invention is here illustrated as being embodied in a portable crane, as shown in Fig. 1, and which includes, generally, a horizontal elongated body 1 formed at its forward end with a forwardly opening yoke 2 which connects the body 1 with a two-wheel tractor 3 in vertically inflexible but horizontally swiveling relation whereby the tractor is steerable relative to said body.

The rear end of body 1 is supported by a rear wheel truck which includes, generally, a transversely extending axle housing 4 and ground engaging wheels 5 at the ends of said housing; the body 1 being attached to housing 4 centrally of the ends of the latter in rigid relation.

An elongated heavy-duty boom 6, of skeleton construction, is normally disposed at an upward and rearward incline from connection with the body 1 intermediate the ends of the latter and adjacent the forward end; the boom projecting rearwardly to a termination at its upper end at a point some distance to the rear of wheels 5. Intermediate its ends the boom 6 is supported by an upstanding post 7. The lower end of said post unit is connected to and supported by the rear axle housing 4.

The main lifting cable of the crane is indicated at 8, and such cable extends from one drum of a power winch 9 on the rear end of tractor 3 in sheave guided relation rearwardly to the outer or upper end of the boom 6, from which said cable depends, in block and tackle arrangement, to a crane hook 10.

The gauge of the wheels 5 is variable whereby a relatively wide gauge can be had when the crane is in use and to then provide great lateral stability; such variance in gauge being accomplished by means of the following structure:

Each wheel 5 is provided with a separate axle 11 having a projecting spindle 12 on which the wheel is journaled by means of a bearing assembly 13; said axle being threaded through a bushing 14 fixed in the adjacent outer end of housing 4. Axially inwardly of the bushing 14 the axle 11 is supported by a collar 15 fixed in the housing, and a stop head 16 on the inner end of the axle limits the extent to which axle 11 may screw out of the bushing 14.

A radial arm 17 is fixed on each axle 11 and projects outwardly between the end of housing 4 and adjacent portion of the corresponding wheel. A spring pressed latch pin unit 18 is mounted on the housing with the pin normally but releasably seated in a matching socket in arm 17, whereby to prevent rotation of the normally retracted axle 11 relative to bushing 14. Another spring pressed latch pin unit 19 is fixed on the rim of the wheel and the pin of this unit is adapted to engage in but is normally free of a socket 20 in arm 17.

The latch pin units 18 and 19 each include a head and slot arrangement 21 by means of which the pin can be retracted and held in such position by turning the pin head at a right angle to the slot.

The wheels and latch pin units are in the position shown in Fig. 2 when the crane is being transported, while preparatory to use of the crane the pin of unit 18 is retracted from arm 17 and the pin of unit 19 is engaged with said arm.

Thereafter the crane is moved slowly to cause rotation of the wheels 5 and axles 11 in the direction which results in said axles, which are oppositely threaded relative to each other, screwing outwardly to an extended position (see Fig. 3), and which increases the gauge of said wheels. Thereafter, while the crane is in use, the pins of both latch units are retracted. After the crane has been used and it is desired to move the same from place to place, the above described procedure is reversed whereby to decrease the gauge of the wheels to the desired road gauge.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A portable crane comprising a longitudinal body, means supporting said body above and for movement along the ground including a pair of transversely spaced rear wheels, a rearwardly and upwardly inclined boom connected at its forward end on the body some distance ahead of said rear wheels, and means mounting said wheels in connection with the body for axial adjustment whereby to vary the gauge thereof, said last named means including separate oppositely threaded screw axles normally but releasably secured against rotation, and normally inoperative means to lock the wheels and axles against relative rotation.

2. A portable crane including a boom supporting body adapted for movement along the ground, a pair of transversely spaced rear wheels, a transverse axle housing mounted on the body between said wheels, separate axles on which the wheels are rotatably mounted, said axles being oppositely threaded into the adjacent end of the axle housing, and releasable means to lock the axles to the housing or to the wheels selectively, said means comprising a radial arm projecting from each axle between the adjacent end of the housing and the corresponding wheel, releasable latch units mounted on the housing and arranged to latch with said arms when the axles are retracted and other releasable latch units mounted on the wheels and arranged to latch with said arms.

3. A wheel gauge adjustment for an implement which includes a pair of transversely spaced ground engaging wheels disposed adjacent corresponding ends of a fixed axle housing; said wheel gauge adjustment comprising separate axles on which the wheels are rotatably mounted, said axles being oppositely threaded into the adjacent end of the axle housing, and releasable means to lock the axles to the housing or to the wheels selectively, said means comprising a radial arm projecting from each axle between the adjacent end of the housing and the corresponding wheel, releasable latch units mounted on the housing and arranged to latch with said arms when the axles are retracted, and other releasable latch units mounted on the wheels and arranged to latch with said arms.

OSCAR RAYMOND PETERSON.